US009955002B2

United States Patent
Yao et al.

(10) Patent No.: US 9,955,002 B2
(45) Date of Patent: Apr. 24, 2018

(54) SOCIAL CALLER ID WITH REVERSE LOOK-UP

(71) Applicant: Facebook, Inc., Menlo Park, CA (US)

(72) Inventors: Rose Yao, San Francisco, CA (US); Brandon Marshall Walkin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/358,323

(22) Filed: Nov. 22, 2016

(65) Prior Publication Data

US 2017/0078481 A1    Mar. 16, 2017

Related U.S. Application Data

(63) Continuation of application No. 13/214,940, filed on Aug. 22, 2011, now Pat. No. 9,544,425.

(51) Int. Cl.
| | |
|---|---|
| *H04M 1/56* | (2006.01) |
| *H04M 3/42* | (2006.01) |
| *H04L 12/58* | (2006.01) |
| *H04W 4/20* | (2018.01) |

(52) U.S. Cl.
CPC ........ *H04M 3/42042* (2013.01); *H04L 51/36* (2013.01); *H04L 51/38* (2013.01); *H04W 4/206* (2013.01); *H04M 2203/354* (2013.01); *H04M 2203/655* (2013.01)

(58) Field of Classification Search
USPC ............. 379/142.06, 142.1, 142.11, 142.09, 379/142.04, 127.01
See application file for complete search history.

(56) References Cited

U.S. PATENT DOCUMENTS

| | | | |
|---|---|---|---|
| 2003/0036914 A1* | 2/2003 | Fitzpatrick ............. | G06Q 30/02 705/319 |
| 2004/0148275 A1 | 7/2004 | Achlioptas | |
| 2008/0152097 A1* | 6/2008 | Kent ....................... | H04L 12/66 379/93.01 |
| 2009/0157513 A1 | 6/2009 | Bonev et al. | |
| 2010/0082695 A1* | 4/2010 | Hardt ................ | G06F 17/30893 707/798 |
| 2010/0262576 A1 | 10/2010 | Stockwell et al. | |
| 2012/0215773 A1* | 8/2012 | Si ........................... | G06Q 30/02 707/723 |

* cited by examiner

*Primary Examiner* — Yosef K Laekemariam
(74) *Attorney, Agent, or Firm* — Baker Botts L.L.P.

(57) ABSTRACT

Methods and systems directed to a social caller ID application that performs a reverse look up on an incoming communication to determine a specific member of a social networking system associated with the incoming communication, and, based on the social relationship between the detected member and the recipient of the communication, display particular information to the recipient. In this manner, a user is provided a caller ID system that leverages information stored remotely on a social network.

12 Claims, 6 Drawing Sheets

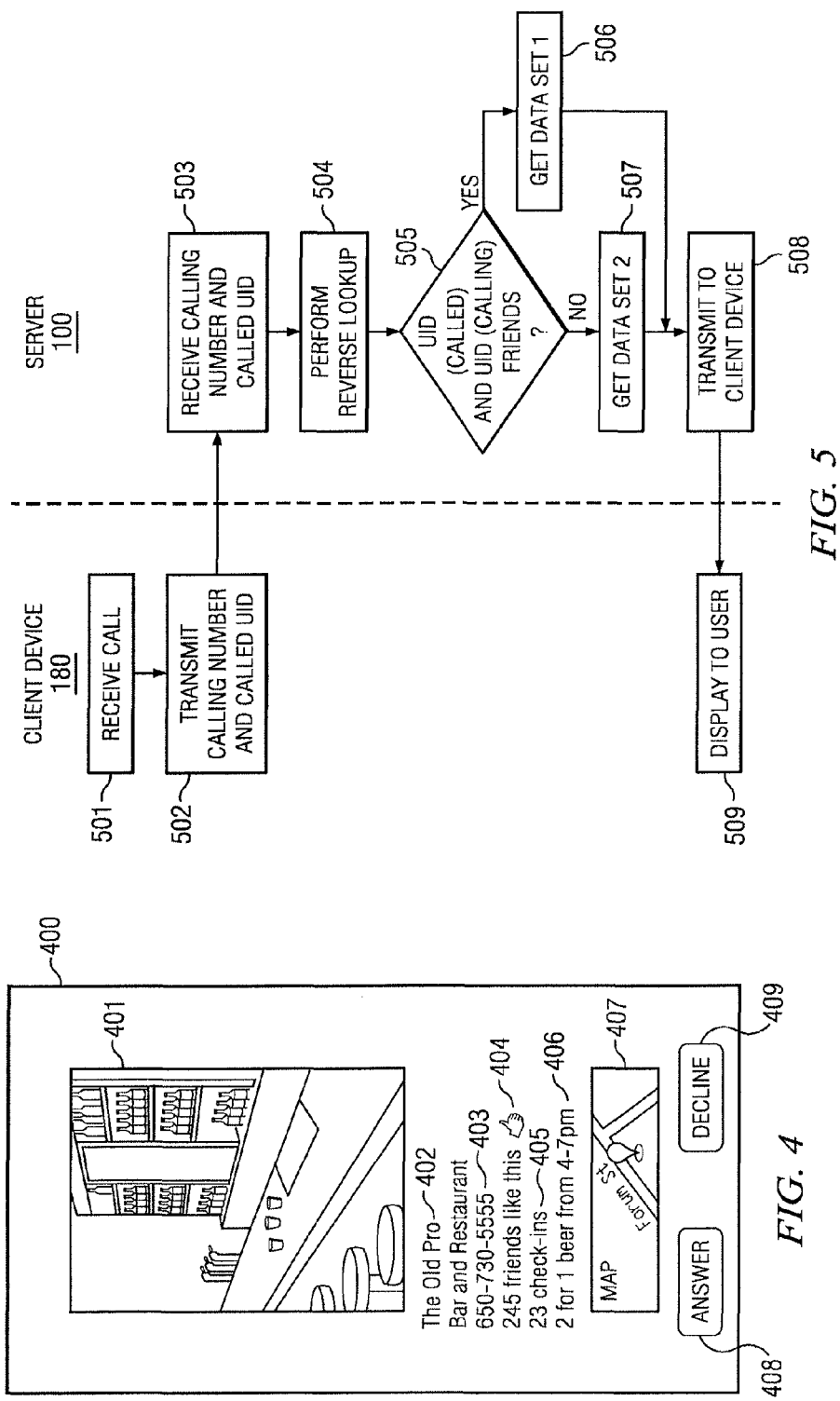

SOCIAL CALLER ID WITH REVERSE LOOK-UP

RELATED APPLICATION

This application is a continuation of U.S. patent application Ser. No. 13/214,940 filed Aug. 22, 2011, entitled "Social Caller ID With Reverse Look-Up", which is currently pending, the disclosure of which is hereby incorporated by reference.

TECHNICAL FIELD

The present disclosure relates generally to integration of profile information stored remotely at a social networking system into a caller identification system.

BACKGROUND

The advent of social networking and ubiquitous wireless data networks allows a user of the social network to remotely retrieve an enormous amount of profile data for his or her contacts, or friends, on the social network with little to no latency. Until relatively recently, accessing wireless data through a mobile carrier's packet-switched network while receiving a call over their circuit-switched network was impossible; however, technological advancements have made simultaneous wireless voice and data calls possible. Traditional directory service-based caller ID systems lack access to important data that is available on the social networking system. Furthermore, directory-based caller ID systems, even having access to profile data, have no means for differentiating whom to display profile information, nor any means of differentiating what profile data is relevant to a user. Typically, users have only a brief amount of time to read caller ID data before deciding whether to answer the call.

BRIEF DESCRIPTION OF THE DRAWINGS

FIG. 4 illustrates an example interface implementing a social caller ID for a business or hub.

FIG. 5 is a flowchart illustrating an example method of pulling profile data from a server.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to a caller ID application that pulls profile information from a social networking system. The caller ID application determines whether the incoming caller is also a friend of the user account associated with the mobile or computing device, and depending on whether the caller is a friend, displays various information that is deemed to be relevant to the user receiving the call.

Implementations of the present invention extend these concepts by allowing a caller ID application to make the determination locally, or send all caller source data to the server for the server to make the determination. Furthermore, even in the scenario where the caller is not a friend of the member of the social network, the social networking system may still pull public profile information for display to the user receiving the call. Further, when the incoming number is not associated with any particular user, but a hub page representing a business, the social network may also pull information from the hub page for display to the user. Thus the application provides a user receiving a call immediate, socially relevant information that he or she may reference during the call, or to decide whether to accept the call.

Figure 1:
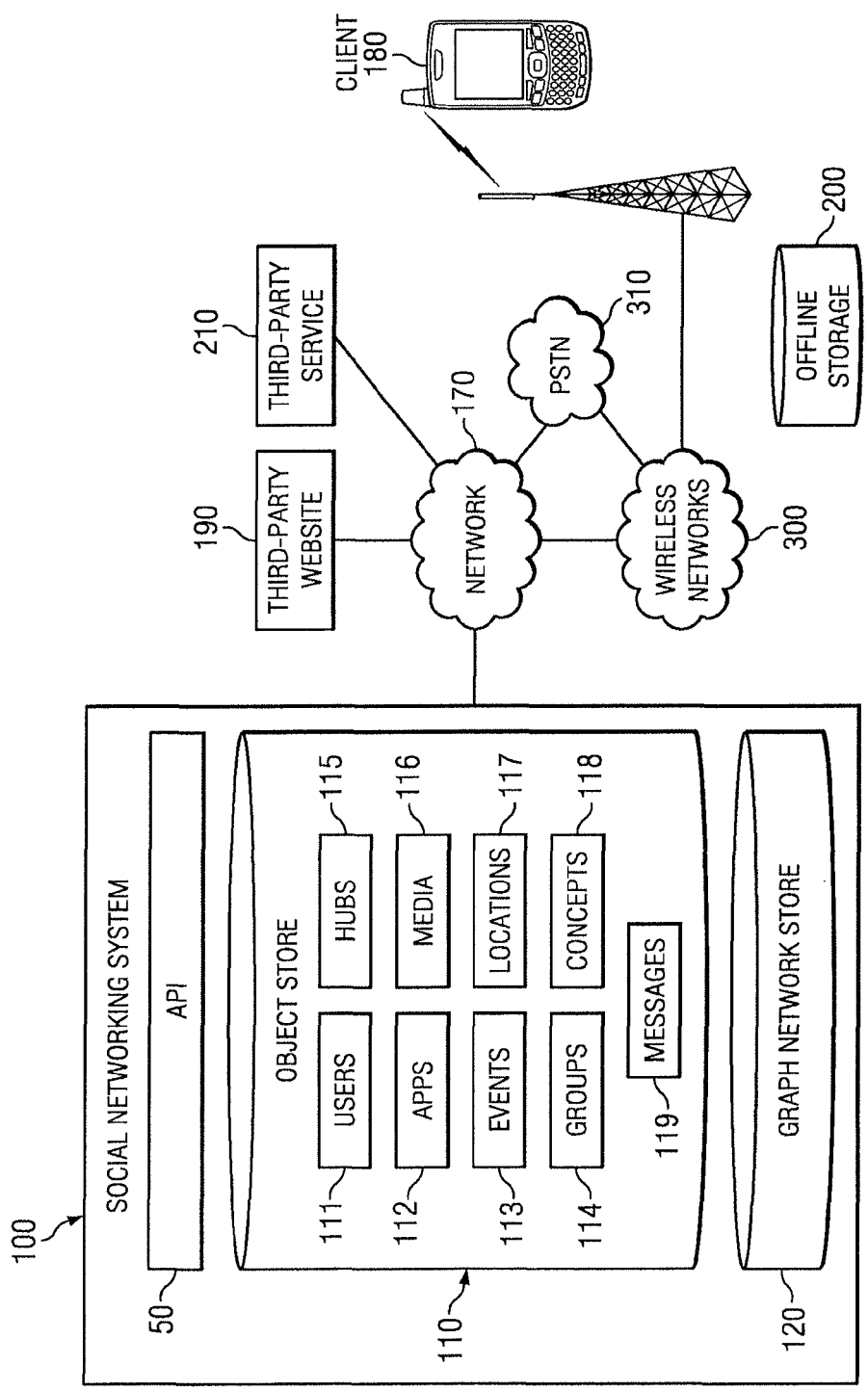
FIG. 1 illustrates an example social networking environment.

FIG. 1 is a high-level block diagram of an integrated messaging system according to one embodiment. FIG. 1 illustrates a social networking system 100, client device 180, wireless cellular network 300, third-party website 190, third-party communication service 210, and public-switched telephone network 310. It is understood that wireless cellular network 300 represents multiple wireless cellular networks provided by a plurality of carriers. FIG. 1 also includes offline storage 200 that is local to client device 180. Client device 180 is depicted as a mobile phone, but client device 180 may comprise any type of computing device, including mobile phone, laptop, netbook tablet, cable box, television, etc. Client device 180 is any computing device capable of receiving a call, whether it is a VoIP call through a packet-based data network 180, or a voice call from circuit-switched networks such as PSTN 310. Client device 180 has one or more memories capable of storing call, text, and other messaging data, depicted in FIG. 1 as offline storage 200.

Client device 180 interacts with external websites 190 and other service providers 210 through a web browser residing on the client device, or a dedicated application local to client device 180. For example, client device 180 may interact with third-party instant VoIP service 210, such as Google Voice™ or Skype™, by visiting and logging into their account via a web browser, or by installing and running a dedicated application. The same applies for video calls via third-party service providers 210 such as Apple FaceTime™ or Tango. This disclosure contemplates any type of third-party service provider 210 connected to network 170 or PSTN 300.

A user of the client device 180 interacts with the social networking system 100 via an application, such as a web browser or a native application, to perform operations such as browsing content, posting and sending messages, retrieving and sorting messages received from other users, and the like. Messages can be in any electronic message format such as electronic mail ("e-mail") messages, chat messages, comments left on a user's webpage, and short message service (SMS) text messages. Messages can contain plain text, or they can contain other content such as pictures, videos, and attachments. Each user has a mailbox that includes messages that are both sent and received by the user. Client device 180 may also use an application or browser to pull and view profile information for various user nodes and hubs in social networking system 100.

Client device 180, connected through wireless network 300, may also interact with other client devices through the circuit-switched, or non-data, portion of wireless network 300. For example, a user at client device 180 may transmit and receive a non-VoIP call to a cellular phone or landline in PSTN 310, transmit and receive a text or multi-media message through the SMS or MMS channels, or receive push notifications through the SMS control channel.

Additionally, the third party website 190 can also interact with the social networking system 100 via a system-provided application programming interface (API) 50. For example, the third party website can perform operations supported by the API, such as delivering messages to the social network system 100, retrieving messages stored by the social networking system 100, and obtaining social information about users of the social networking system 100.

The social networking system 100 comprises an object store 110, and a graph information store 120. The object store 110 stores information on objects, such as users, represented in or by the social networking environment 100. The graph information store 120 stores information on the relationships of the objects in the object store 110.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph. In particular embodiments, profile information for user nodes is stored in user store 111, while hub page information for concepts, such as businesses, is stored in hubs store 115. Nodes directly connected by a friend edge are considered one degree of separation away, and are listed as "friends" on the social network. Users of the social network may specify elements or portions of their profile which may be viewed only by friends, or friends of friends (second degree contacts). In particular embodiments, users may define privacy settings that only allow certain groups or individual members of the social network to view portions of their profile. For further detail on hubs, please see U.S. patent application Ser. No. 12/763,171 titled, "Integrated Social Network Environment," previously filed on Apr. 19, 2010 and fully incorporated by reference herein.

Figure 2:
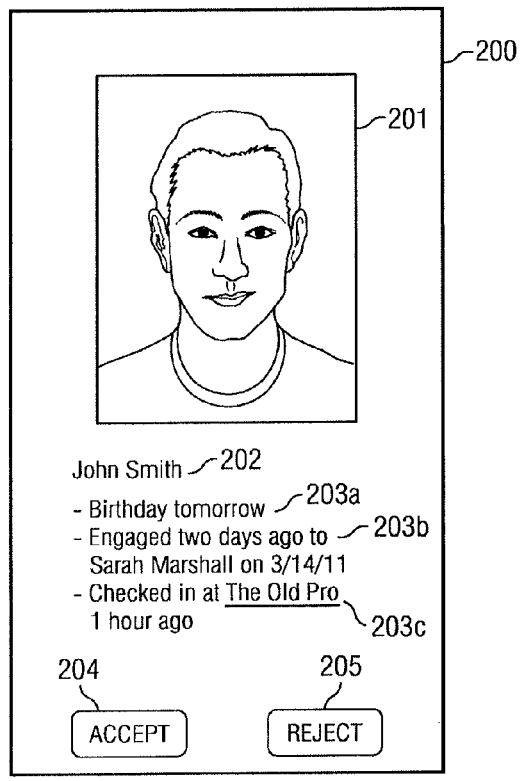
FIG. 2 illustrates an example interface implementing a social caller ID for a friend of the user.

FIG. 2 illustrates an example interface displayed to a user when the user's client (or mobile) device 180 receives a call from a source associated with one of the user's contacts, or friends, on social networking system 100. The caller ID screen 200 is displayed substantially simultaneously with the incoming communication. In particular embodiments, this incoming communication is a voice call, and the communication source is the incoming phone number. In particular embodiments, this communication is a VoIP call, and the communication source is an account (generally a username) for the VoIP service. In particular embodiments, the communication is a video chat, and the communication is an account (usually a username) for the video chat service. In other embodiments, the incoming communication is an e-mail, direct message from a third-party site, instant message, SMS/MMS message, and the like. Although this disclosure primarily pertains to real-time full-duplex communications, all other forms of communication are contemplated.

Caller ID screen 200 includes a photo 201 of the incoming caller pulled from user store 111. In particular embodiments, photo 201 is the profile picture for the incoming caller. In particular embodiments, photo 201 is a random photo pulled from the incoming caller's photos. In particular embodiments, photo 201 is a photo that the incoming caller has been tagged in.

Caller ID screen 200 also includes the incoming caller's name 202 and socially relevant data 203$a$-$c$ that the user may quickly skim when deciding whether to accept or reject the call. Socially relevant data 203 is anything that may be pertinent to the user to discuss on the call. For example, if the incoming caller's birthday is within a predetermined amount of time, for example, one week, a reminder 203$a$ is displayed. As another example, a change in relationship status, such as from "in a relationship" to "engaged", may be relevant to the user so that he may congratulate the caller. Conversely, a relationship status change from "in a relationship" to "single" may be an event that the user may want to express condolences or general excitement about. Generally speaking, any new data added to a profile may be considered "socially relevant." For example, if the caller recently added a new employer to his or her profile, there is a high probability that the caller recently started a new job. The caller ID screen may also list the name of the person the caller is in a relationship with, as in 203$b$. Thus, the user is assisted in making small talk and other pleasantries. In particular embodiments, Caller ID screen 200 includes the names and ages of the caller's children.

Finally, caller ID screen 200 displays locations that the user has checked-in to within a predetermined amount of time. For example, 203$c$ shows that John Smith checked-in to The Old Pro 1 hour ago. The user may find this data socially relevant in order to coordinate a physical meeting with John Smith, or to make later plans. The display of check-in information 203$c$ is constrained both temporally and geographically. For example, it is not relevant if the caller has checked into a location over 2 days ago. As another example, if the user is determined through location-based services to be in San Francisco, a check-in in New York or Los Angeles by the caller is not socially relevant to the user. In particular embodiments, check-in 203$c$ lists how many of the user's friends, if any, are also at the same location.

Because of the short amount of time a user has to answer (through input 204) or reject (through input 208) a phone call before it is dropped, goes to voicemail, or the caller gives up, the amount of socially relevant data 203 should be accordingly constrained to a high-pressure situation. As a general principle, only data which is pertinent to the user, easily read, and digested should be displayed.

In particular embodiments, privacy information is respected by the application generating Caller ID screen 200. For example, if the caller has put the user on a limited profile that does not allow the user to see his relationship status, that setting will be respected and not displayed to the user. The only information that the user is displayed is information the user has been granted permission by the calling member to view.

Figure 3:
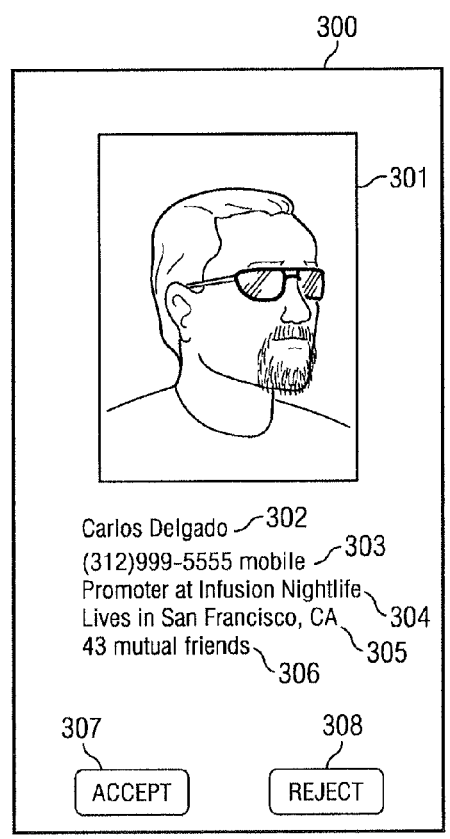
FIG. 3 illustrates an example interface implementing a social caller ID for a non-friend of the user.

FIG. 3 illustrates an example caller ID screen 300 when client device 180 receives a call from a member of social networking system 100 that is not a friend or connection of the user associated with client device 180. Caller ID screen 300 also includes a profile picture 301 as described above, as well as the caller's name 302, phone number 303, and the type of phone number (mobile, home, etc.). Because the user is not a friend on social network 100 with the caller, Caller ID screen 300 is significantly different. Instead of providing socially relevant data to assist in further interactions such as making plans or small talk, caller ID screen 300 primarily attempts to provide information to assist the user in deciding whether to answer the call.

Accordingly, for callers who are members of social networking system 100, but not friends of the user account associated with the mobile device, a second set of profile data akin to a business card is displayed to the user. For example, in FIG. 3, Caller ID screen 300 includes the position the caller holds, and the company 302 where the caller holds his or her position. In this example, Carlos Delgado holds the position of "Promoter" at "Infuzion Nightlife." In particular embodiments, caller ID screen 300 includes geographic information such as where the caller lives 305. In particular embodiments, caller ID screen 300 also displays socially relevant data, such as the number of mutual friends 306 between the user and the caller. Thus the recipient of the call (the user of client device 180) may, from the caller's profile photo, profession, company, and the number of mutual friends, appropriately decide whether to decline or reject the incoming call through input 307. Alternatively, the user may accept the incoming communication through input 308.

As above, only information the user is authorized to the member to view, is displayed in Caller ID screen 300. Because the user and the caller are not friends on the social network, this is generally limited to information that the caller has made publicly visible on his or her profile page. In particular embodiments, the caller may have made information visible to member of specific networks, such as his or her alma mater or geographic location. The application generating caller ID screen 300 respects privacy settings so that only what would be viewable by the user normally, such as through visiting the calling member's profile page, is visible in caller ID screen 300.

FIG. 4 illustrates an example caller ID screen 400 when client device 180 receives a call from a number that is associated with a concept node page, or "hub." As briefly described above, non-user entities may maintain nodes on social networking system 100, and each non-user entity may also have a profile page, also known as a "hub." In particular embodiments, all the information on hub pages is public, and is entered into the hub page by the administrator of the concept node associated with the hub.

Caller ID screen 400 includes a picture 401 of the business or node owner. In particular embodiments, picture 401 is the profile picture for the hub. In particular embodiments, caller ID screen 400 includes the name of the business 402 or hub owner (in this case, "The Old Pro") and its phone number 403. In particular embodiments, caller ID screen 400 also includes socially relevant data, such as, for example, the number of friends of the user who have "liked" the hub 404, and the number of friends who have or are currently checked-in to the hub 405. In particular embodiments, socially relevant information such as ongoing deals or promotions 406 in displayed in caller ID screen 400, such as the example promotion "2 for beers from 4-7 PM." Additionally, in particular embodiments, a map 407 to the business or location associated with the hub may be displayed. In particular embodiments, the address of the business may be displayed in lieu or in addition to a map. In particular embodiments, this map is selectable and can provide a link to navigation instructions or other actions by client device 180.

FIG. 5 is a flowchart illustrating an example method of displaying social caller ID screens 200, 300, and 400. FIG. 5 depicts a method wherein there is no processing performed on client device 180, and all the decisional logic and processing is performed on one or more servers that are part of social networking system 100. At step 501, client device 180 receives a communication, in this example, a call. As disclosed, this disclosure contemplates any form of communication, and is not limited to real-time full-duplex communications. For didactic purposes, however, FIG. 5 assumes the communication is a voice call.

At Step 502, client device 180 transmits the calling number and the user of client device 180's social networking user ID. In particular embodiments, the user of client device 180 associates a social networking user ID with client device 180 when he or she first uses the device, and the user ID is transmitted through a specialized application on client device 180. In other embodiments, the user ID is explicitly transmitted in all transmissions to the social networking system 100. In other embodiments, the user ID is associated on the server-side of the social networking system with a client device identifier, such as a phone number, IMSI, IMEI, or the like. Regardless, the social networking system associates client device 180 with a particular member, called the "user" in this disclosure for purposes of simplicity. For the purposes of FIG. 5, the identifier transmitted to the server identifying the incoming communication is a phone number, but this disclosure contemplates all other means of identifying an incoming communication, such as a username for a third-party service such as Skype, Google Voice, or FaceTime, an e-mail address for an incoming e-mail, and the like.

At step 503, an application residing on one or more servers of social networking system 100 receives the calling number (or other identifier) and the user identifier associated with client device 180. At Step 504, the application residing on the social networking system 100's servers performs a reverse lookup of the incoming caller number with all the members of the social networking system. User store 111 and hubs store 115 may store phone numbers in conjunction with particular members or concept nodes of the social network. The application attempts to match the number with a number existing in user store 111 or concept store 118. After finding a match, the application looks up the social networking user identifier for the user or concept node associated with the number. In particular embodiments, user phone numbers (or other identifiers) may be stored by the user on his or her own profile, or alternatively, by a first user, in the online phonebook of the first user, for, and in conjunction with a second user. Naturally, in such a scenario, the reverse look-up would return the user ID of the second user. In particular embodiments, the IDs represent user or concept nodes in the social graph.

At Step 506, the application residing on one or more of the servers of social networking system 100 access the graph network store to determine the relationship, if any, between the called user node and the calling node. If there is a first degree connection between the calling ID and the called user ID, the application determines that the calling party and the called party are friends, and proceeds to step 506. At step 506, a first data set is generated. In particular embodiments, the data set corresponds to the data displayed in FIG. 2.

If the application determines that there is no connection between the calling node and the called user node, the process proceeds to Step 506, where a second data set is generated. In particular embodiments, the second data set corresponds to the data displayed in FIG. 3, or, if the calling node is a concept node, the data displayed in FIG. 4. If the server determines from the social graph that the calling node is a user node, and there are second-degree connections between the calling node and the called node, it may include a number and list of these mutual friends in the data set. In particular embodiments, if the server determines from the social graph that the calling node is a concept node, and that there are second degree edge connections between the calling concept node and the called user node, it may include a number and list of friends who have expressed an affinity (either through reviewing, commenting, or "liking" the concept node) in the data set. In this fashion, the server determines what data to include in the data set based off social graph relationships between the calling node and the called node. After the application generates the data set, in Step 508 it is transmitted back to the client.

After receiving the data set in step 509, client device 180 displays the data set to the user as depicted in FIGS. 2-4. The method of FIG. 5 relies on relatively fast data transfer rates between mobile device 180 and social networking system 100. However, in many scenarios, mobile device 180 does not have a sufficiently fast data connection to deliver the identification information and download the data sets in a meaningful time. For instance, a phone may ring only a total of 10 seconds before the caller hangs up, or the system sends the caller to voice mail.

Figure 6:
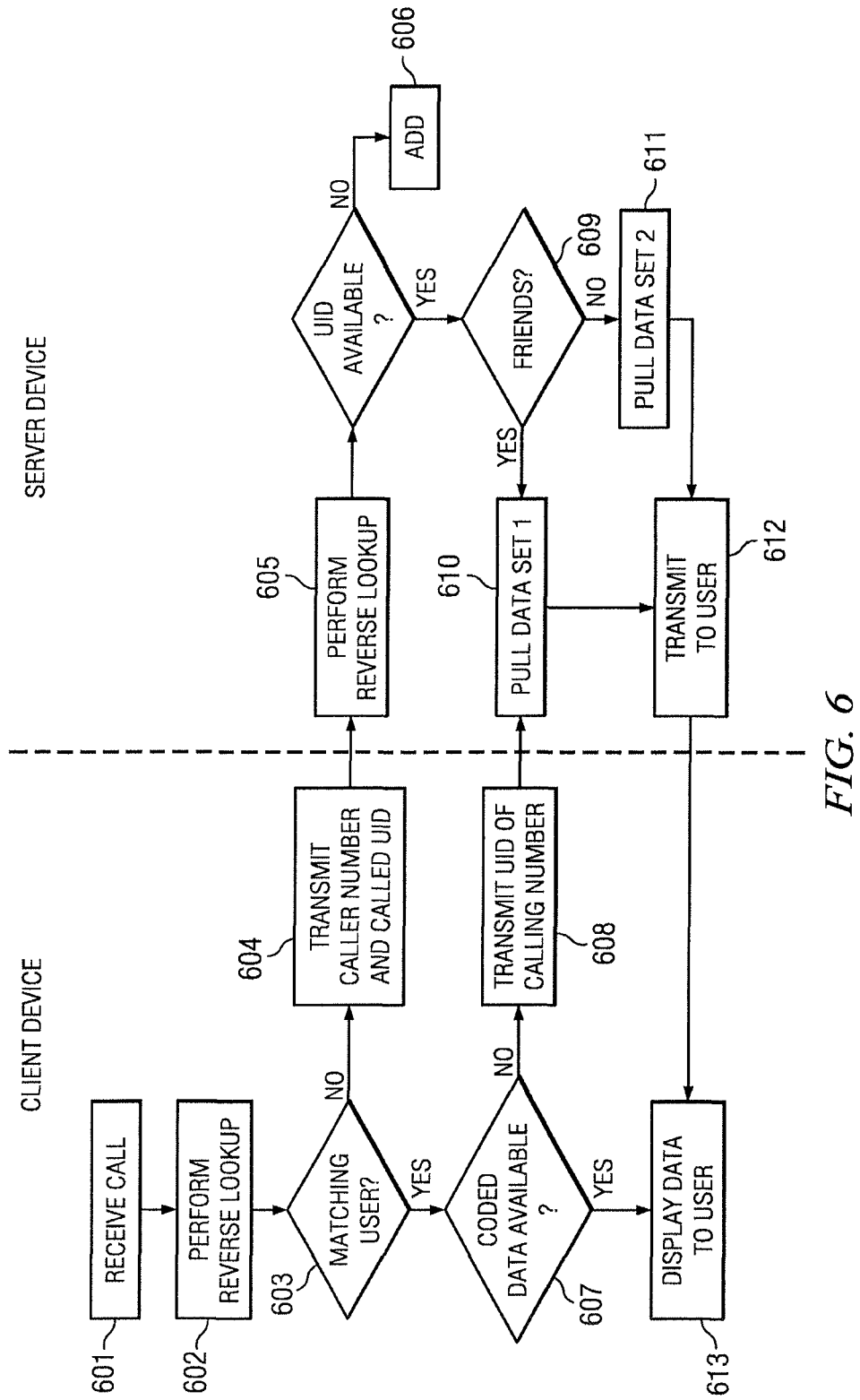
FIG. 6 is a flowchart illustrating an example method of pulling pre-cached profile data from a local data store.

FIG. 6 is a flowchart illustrating an example method wherein profile data is pre-cached, and a portion of the decisional logic is performed locally on client device 180. At step 601, client device 180 receives a communication, in this example, a call. As disclosed, this disclosure contemplates any form of communication, and is not limited to real-time full-duplex communications. For didactic purposes, however, FIG. 6 assumes the communication is a voice call.

At 602, client device 180 performs a reverse lookup in the user's contacts, much as a traditional caller ID system would. However, where contacts are also linked to a user ID of a member of social networking system 100, the reverse lookup returns the user ID, rather than a contact name entered by the user.

If the reverse look-up yields a matching social network user identifier, the flow proceeds to step 606, where mobile device looks for cached profile data for the identified user ID. If cached data is available, a data set is generated and displayed to the user. In particular embodiments, the data set resembles the data required to display caller ID screen 300.

Profile data may be cached in a variety of methods. In particular embodiments, mobile device 180 is constantly downloading data from the user's friends' profiles in the background. However, this method is expensive from a battery life and radio resources standpoint. In particular embodiments, the profile data is downloaded only the first time a user visits the social networking system through client device 180. In particular embodiments, mobile device 180 keeps a timestamp of the last download of profile data, and only downloads profiles that have been updated since the last update. In particular embodiments, each individual element of user profiles are time stamped, and only the individual elements, such as job or relationship status, are downloaded. In particular embodiments, client device 180 knows that certain elements of profiles do not change, such as birthday, hometown, educational information, etc., and bypasses updating those elements. This disclosure contemplates any method of caching profile data in client device 180.

If the reverse look-up operation at Step 602 and Step 603 does not yield a corresponding user ID, mobile device 180 at Step 604 transmits the calling party's number and the called party's social networking identifier to social networking system 100. From here, the method is substantially identical to the purely server-side processing of FIG. 5.

In Step 606, the application at social networking system 100 performs a reverse look-up. There is a possibility that the number is not associated with any node in the social network, and at Step 606, if such a determination is made, the process ends. If, however, the application determines a social networking identifier, representing a node in the social graph, associated with the calling party's number, the application at Step 609 accesses social graph store 120 to determine whether there is a first-degree friend connection between the called user node and calling node. If there is a connection, indicating that the two user nodes are friends, the application, at Step 610, pulls a first set of data from user store 111. In particular embodiments, the data set corresponds to the data displayed in FIG. 2.

If the calling node and the called user node lack a first-degree friend connection, the method proceeds to Step 611. The application then pulls a different set of data for display. In particular embodiments, if the calling node is a user, the application pulls data as displayed in FIG. 3. In particular embodiments, if the calling node is a concept node, the application pulls the data displayed in FIG. 4.

Regardless of what data is pulled, the data set is transmitted to client device 180 in Step 612, and displayed at client device 180 at Step 613. In the case that, in Step 603, mobile device 180 recognizes that the incoming number is associated with a friend on the social network, but no pre-cached data exists in its memory, the method proceeds to step 608. Client device 180 may lack pre-cached data for a friend for a variety of reasons. For example, it is possible that the friend was recently added, and client device has not yet had a chance to pull the data. In other cases, the pre-cached data for a particular friend is too old, or did not exist in the friend's profile at the time. Regardless, having determined in Step 806 that no pre-cached data exists for the given friend, client device in Step 608 translates the friend's social networking identifier to the server, obviating the need for the server to perform a reverse look-up on the number.

Because the server has received a User ID, it knows that client device 180 has already determined that the two users nodes are connected by a friend edge, and immediately pulls the first data set in Step 610. In particular embodiments, the first data set comprises the data required to generate social caller ID screen 200. At Step 612, the data set is transmitted back to client device 180 for display at Step 613.

As is evident from the foregoing examples, the methods of FIGS. 5 and 6 break all incoming callers (or communicators) into four distinct groups: 1.) callers who are friends with the user on the social network; 2.) callers who are members of the social network but are not friends with the user; 3.) callers who are associated with businesses or other concept node hubs on the social network; and 4.) non members of the social network. Each of these four categories receives a different data set (though category 4 receives no data whatsoever). In this way, the user is quickly presented with the most socially relevant information to him or her while the client device 180 is ringing. The social relevance of data is determined by the types, degree, and number of connections between the calling node and the called node in the social graph. Therefore, different types of data and different elements are displayed to the called user based upon the social graph relationship between the user's node and the calling party's node. The user experience is thus greatly enhanced.

Figure 7:
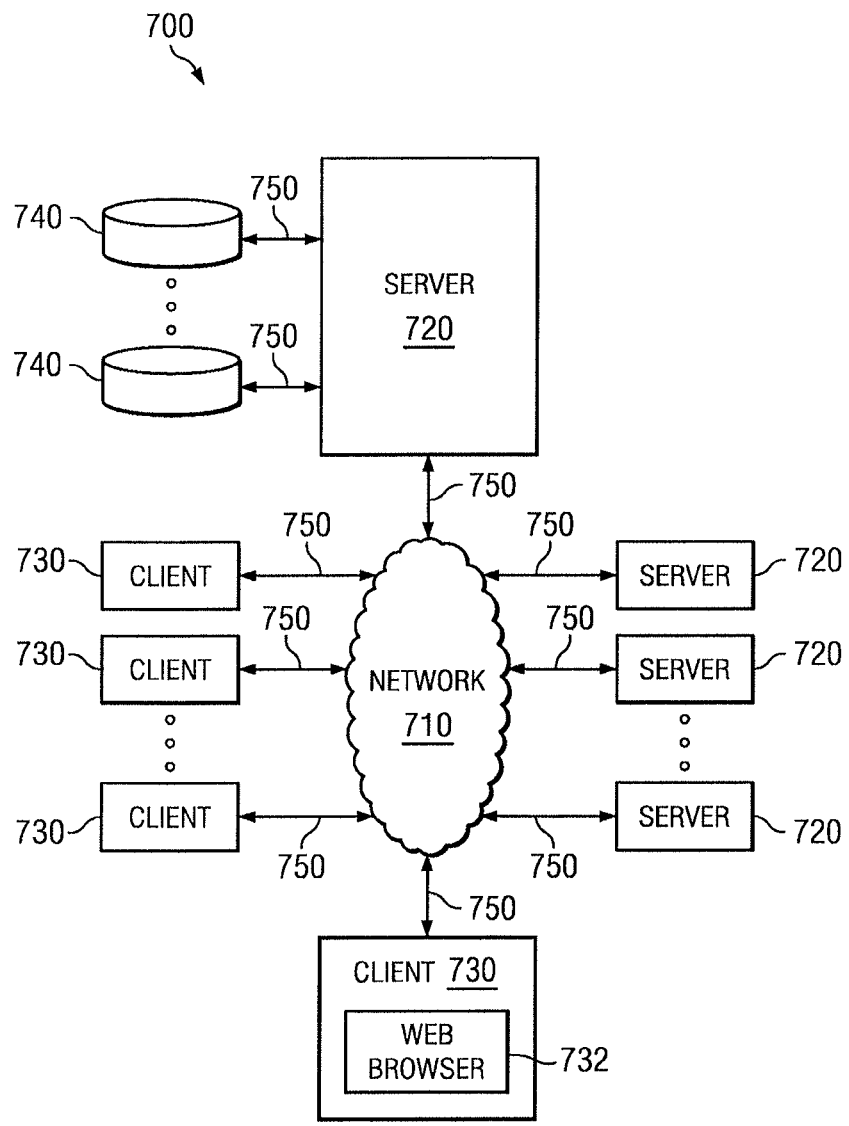
FIG. 7 illustrates an example network environment

While the foregoing embodiments may be implemented in a variety of network configurations, the following illustrates an example network environment for didactic, and not limiting, purposes. FIG. 7 illustrates an example network environment 700. Network environment 700 includes a network 710 coupling one or more servers 720 and one or more clients 730 to each other. Network environment 700 also includes one or more data storage 740 linked to one or more servers 720. Particular embodiments may be implemented in network environment 700. For example, a social networking system frontend may be written in software programs hosted by one or more servers 720. For example, event database 102 may be stored in one or more storage 740. In particular embodiments, network 710 is an intranet, an extranet, a virtual private network (VPN), a local area network (LAN), a wireless LAN (WLAN), a wide area network (WAN), a metropolitan area network (MAN), a portion of the Internet, or another network 710 or a combination of two or more such networks 710. The present disclosure contemplates any suitable network 710. One or more links 750 couple a server 720 or a client 730 to network 710. In particular embodiments, one or more links 750 each includes one or more wired, wireless, or optical links 750 or networks.

In particular embodiments, each server 720 may be a unitary server or may be a distributed server spanning multiple computers or multiple datacenters. Servers 720 may be of various types, such as, for example and without limitation, web server, news server, mail server, message server, advertising server, file server, application server, exchange server, database server, or proxy server. In particular embodiments, each server 720 may include hardware, software, or embedded logic components or a combination of two or more such components for carrying out the appropriate functionalities implemented or supported by server 720.

In particular embodiments, one or more data storages 740 may be communicatively linked to one or more servers 720 via one or more links 750. In particular embodiment, each data storage 740 may be a relational database. Particular embodiments may provide interfaces that enable servers 720 or clients 730 to manage, e.g., retrieve, modify, add, or delete, the information stored in data storage 740.

In particular embodiments, each client 730 may be an electronic device including hardware, software, or embedded logic components or a combination of two or more such components and capable of carrying out the appropriate functions implemented or supported by client 730. For example and without limitation, a client 730 may be a desktop computer system, a notebook computer system, a netbook computer system, a handheld electronic device, or a mobile telephone. The present disclosure contemplates any suitable clients 730. A client 730 may enable a network user at client 730 to access network 710. A client 730 may enable its user to communicate with other users at other clients 730.

A client 730 may have a web browser 732, and may have one or more add-ons, plug-ins, or other extensions. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. The present disclosure contemplates any suitable web page files Herein, reference to a web page encompasses one or more corresponding web page files (which a browser may use to render the web page) and vice versa, where appropriate.

Figure 8:
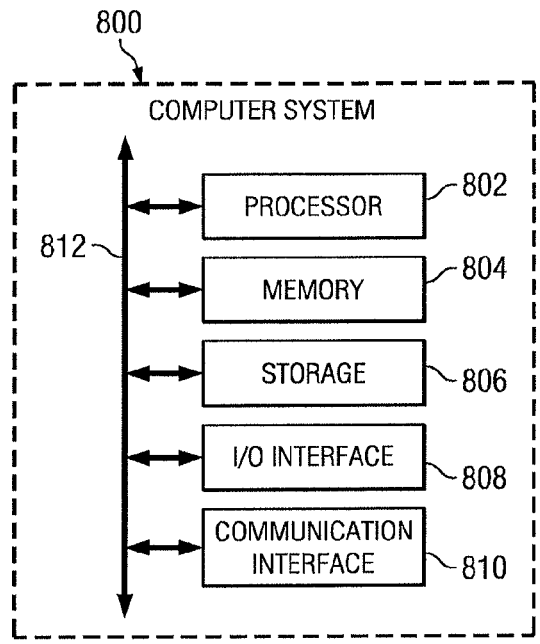
FIG. 8 illustrates an example computing system.

FIG. 8 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. One or more memory buses (which may each include an address bus and a data bus) may couple processor 802 to memory 804. Bus 812 may include one or more memory buses, as described below. Although this disclosure describes and illustrates particular memory, this disclosure contemplates any suitable memory.

In particular embodiments, storage 806 includes mass storage for data or instructions. As an example and not by way of limitation, storage 806 may include an HDD, a flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. This disclosure contemplates mass storage 806 taking any suitable physical form. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. One or more of these I/O devices may enable communication between a person and computer system 800. This disclosure contemplates any suitable I/O devices and any suitable I/O interfaces 808 for them. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. This disclosure contemplates any suitable network and any suitable communication interface 810 for it. Although this disclosure describes and illustrates a particular communication interface, this disclosure contemplates any suitable communication interface.

In particular embodiments, bus 812 includes hardware, software, or both coupling components of computer system 800 to each other. Although this disclosure describes and illustrates a particular bus, this disclosure contemplates any suitable bus or interconnect.

The client-side functionality described above can be implemented as a series of instructions stored on a computer-readable storage medium that, when executed, cause a programmable processor to implement the operations described above.

Figure 9:
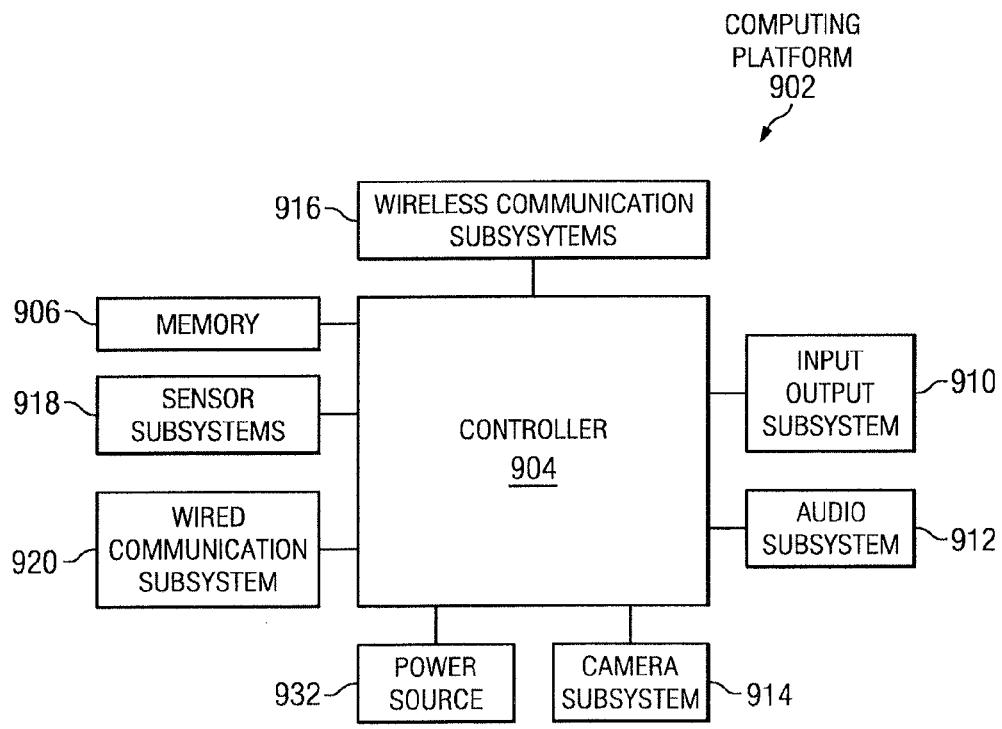
FIG. 9 illustrates an example mobile device.

While client device 180 may be implemented in a variety of different hardware and computing systems, FIG. 9 shows a schematic representation of the main components of an example computing platform 902, according to various particular embodiments. Multipoint sensing devices generally include a controller 904 which may comprise a microcontroller or one or more processors configured to execute instructions and to carry out operations associated with a computing platform. Controller 904 may optionally contain a cache memory unit for temporary local storage of instructions, data, or computer addresses. By way of example, using instructions retrieved from memory, controller 904 may control the reception and manipulation of input and output data between components of computing platform 902.

Controller 904 together with a suitable operating system may operate to execute instructions in the form of computer code and produce and use data. The operating system, other computer code (including control client 908 described below) and/or data may be physically stored within a memory block 906 that is operatively coupled to controller 904.

Memory block 906 encompasses one or more storage media and generally provides a place to store computer code (e.g., software and/or firmware) and data that are used by the computing platform 902. Memory block 906 may include one or more fixed storage devices in the form of, by way of example, solid-state hard disk drives (HDDs), among other suitable forms of memory coupled bi-directionally to controller 904. Information may also reside on a removable storage medium loaded into or installed in multipoint sensing devices when needed. By way of example, any of a number of suitable memory cards may be loaded into computing platform 902 on a temporary or permanent basis.

Controller 904 is also generally coupled to a variety of interfaces such as graphics control, video interface, input interface, output interface, and storage interface, and network interface, and these interfaces in turn are coupled to the appropriate devices. In certain embodiments, Controller 904 may connected to an input structure 914 and display 916 may be provided together, such an in the case of a touch-screen where a touch sensitive mechanism is provided in conjunction with the display 916.

Electric signals (e.g., analog) may be produced by microphone 910 and fed to earpiece 912. Controller 904 may receive instruction signals from input structure 914 and control the operation of display 916. Audio signals may be transmitted and received by means of an antenna 918 that may be connected through a radio interface 920 or audio input interface such as microphone 924 to codec 922 configured to process signals under control of controller 904. Additionally, multipoint sensing devices may be powered power source 932.

Mobile device may also include one or more user input devices 934 (other than input structure 914) that are operatively coupled to the controller 904. Generally, input devices 934 are configured to transfer data, commands and responses from the outside world into multipoint sensing devices.

Display device 916 is generally configured to display a graphical user interface (GUI) that provides an easy to use visual interface between a user of the computing platform 902 and the operating system or application(s) running on the mobile device.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, magnetic tape, a holographic storage medium, a solid-state drive (SSD), a RAM-drive, a SECURE DIGITAL card, a SECURE DIGI- TAL drive, or another suitable computer-readable storage medium or a combination of two or more of these, where appropriate. Herein, reference to a computer-readable storage medium excludes any medium that is not eligible for patent protection under 35 U.S.C. §101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A non-transitory computer-readable media comprising instructions operable, when executed by a computer system to cause the computer system to:
   receive, from a client device associated a first user of a social network system, information associated with a call session between the first user and a second user of the social network system;
   determine that the first user and the second user are not friends within the social network system;
   in response to determining that the first user and the second user are not friends within the social network system, identify at least one additional user of the social network system other than the first user and the second user, the at least one additional user being a mutual friend between the first user and the second user of the social network system; and
   transmit, to the client device associated with the first user, caller identification information identifying at least an identity of the additional user of the social network system who is the mutual friend of both the first user and the second user for display to the first user on the client device during the call session, and
   wherein the first user comprises an individual associated with a first node of a social graph maintained by the social network system and the second user comprises a concept associated with a concept node of the social graph and wherein:
   determining that the first user and the second user are not friends within the social network system comprises using the social graph to determine that the first user is not connected to an entity associated with the concept node of the social graph; and
   identifying the at least one additional user of the social network system comprises identifying at least one third user that has a first-degree relationship with the first user and is connected to the entity associated with the concept node.

2. The non-transitory computer-readable media of claim 1, wherein:
   determining that the first user and the second user are not friends within the social network system comprises using the social graph to determine that a first-degree connection is not maintained between the first user and the second user within the social network system; and
   identifying the at least one mutual friend comprises using the social graph to identify one or more second-degree connections between the first user and the second user of the social network system.

3. The non-transitory computer-readable media of claim 1, wherein the information transmitted to the client device associated with the first user comprises identifies a number of mutual friends between the first user and the second user.

4. The non-transitory computer-readable media of claim 1, wherein:
   the call comprises a telephone communication session; and
   the first user comprises a called party.

5. A method comprising:
receiving, by a computer system associated with a social network system, information associated with a call session between the first user and a second user of the social network system;
determine, by the computer system, that the first user and the second user are not friends within the social network system;
in response to determining that the first user and the second user are not friends within the social network system, identifying, by the computer system, at least one additional user of the social network system other than the first user and the second user, the at least one additional user being a mutual friend between the first user and the second user of the social network system; and
transmit, to the client device associated with the first user, caller identification information identifying at least an identity of the additional user of the social network system who is the mutual friend of both the first user and the second user for display to the first user on the client device during the call session, and
wherein the first user comprises an individual associated with a first node of a social graph maintained by the social network system and the second user comprises a concept associated with a concept node of the social graph and wherein:
determining that the first user and the second user are not friends within the social network system comprises using the social graph to determine that the first user is not connected to an entity associated with the concept node of the social graph; and
identifying the at least one additional user of the social network system comprises identifying at least one third user that has a first-degree relationship with the first user and is connected to the entity associated with the concept node.

6. The method of claim 5, wherein:
determining that the first user and the second user are not friends within the social network system comprises using the social graph to determine that a first-degree connection is not maintained between the first user and the second user within the social network system; and
identifying the at least one mutual friend comprises using the social graph to identify one or more second-degree connections between the first user and the second user of the social network system.

7. The method of claim 5, wherein the information transmitted to the client device associated with the first user comprises identifies a number of mutual friends between the first user and the second user.

8. The method of claim 5, wherein:
the call session comprises a telephone communication session; and
the first user comprises a called party.

9. A system comprising:
a memory storing instructions; and
one or more processors operable to execute the instructions to cause the one or more processors to:
receive, from a client device associated with the first user of a social network system, information associated with a call session between the first user and a second user of the social network system;
determine that the first user and the second user are not friends within the social network system;
in response to determining that the first user and the second user are not friends within the social network system, identify at least one mutual additional user of the social network system other than the first user and the second user, the at least one additional user being a friend between the first user and the second user of the social network system; and
transmit, to the client device associated with the first user, caller identification information identifying at least an identity of the additional user of the social network system who is the mutual friend of both the first user and the second user for display to the first user on the client device during the call session, and
wherein the first user comprises an individual associated with a first node of a social graph maintained by the social network system and the second user comprises a concept associated with a concept node of the social graph and wherein:
determining that the first user and the second user are not friends within the social network system comprises using the social graph to determine that the first user is not connected to an entity associated with the concept node of the social graph; and
identifying the at least one additional user of the social network system comprises identifying at least one third user that has a first-degree relationship with the first user and is connected to the entity associated with the concept node.

10. The system of claim 9, wherein:
when determining that the first user and the second user are not friends within the social network system, the one or more processors are operable to use the social graph to determine that a first-degree connection is not maintained between the first user and the second user within the social network system; and
when identifying the at least one mutual friend, the one or more processors are operable to use the social graph to identify one or more second-degree connections between the first user and the second user of the social network system.

11. The system of claim 9, wherein the information transmitted to the client device associated with the first user comprises identifies a number of mutual friends between the first user and the second user.

12. The system of claim 9, wherein:
the call session comprises a telephone communication session; and
the first user comprises a called party.

* * * * *